United States Patent
Maines

(10) Patent No.: US 6,368,059 B1
(45) Date of Patent: Apr. 9, 2002

(54) CONTROLLED PASSIVE POROSITY SYSTEMS TO MITIGATE CAVITATION

(75) Inventor: Brant H. Maines, Arlington, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/627,636

(22) Filed: Jul. 28, 2000

(51) Int. Cl.[7] ............................................. B64C 11/30
(52) U.S. Cl. ..................... 416/42; 416/91; 416/90 A; 416/231 R; 415/914
(58) Field of Search ....................... 415/914; 416/42, 416/90 R, 91, 90 A, 231 R

(56) References Cited

U.S. PATENT DOCUMENTS

| | | | |
|---|---|---|---|
| 3,100,539 A | * 8/1963 | Hulbert | 416/91 |
| 3,749,520 A | * 7/1973 | Bandukwalla | 416/183 |
| 4,003,671 A | 1/1977 | Huse et al. | 415/1 |
| 4,169,567 A | * 10/1979 | Tamura | 244/17.11 |
| 4,503,814 A | 3/1985 | Fujihara et al. | 123/41.3 |
| 4,714,408 A | * 12/1987 | Abe | 416/91 |
| 5,709,419 A | * 1/1998 | Roskey | 290/55 |
| 5,813,625 A | * 9/1998 | Hassan et al. | 244/17.11 |
| 5,992,793 A | 11/1999 | Perry et al. | 244/17.11 |
| 6,022,188 A | 2/2000 | Bancalari | 415/115 |
| 6,089,534 A | * 7/2000 | Biegelsen et al. | 251/129.01 |

* cited by examiner

Primary Examiner—Edward K. Look
Assistant Examiner—Ninh Nguyen
(74) Attorney, Agent, or Firm—Bracewell & Patterson, L.L.P.

(57) ABSTRACT

A controlled passive porosity system includes a lifting device for operation in a multi-phase liquid, the lifting device having a low pressure surface with a plurality of holes and a high pressure surface with a plurality of holes. A common plenum is disposed within the lifting device and allows fluid communication between liquid adjacent the high pressure surface and liquid adjacent the low pressure surface. When cavitation occurs adjacent to the low pressure surface, a series of valves associated with the holes allows selective and localized fluid communication between the surfaces. The fluid communication has the effect of raising the pressure of the liquid in the area of cavitation, thereby eliminating the cavitation. In an alternate embodiment, the lifting device includes a first plenum, a second plenum, and an intermediate fluid passage, the fluid passage fluidly connecting the first plenum and the second plenum. A valve disposed in the fluid passage selectively blocks or allows fluid communication between the high pressure surface and the low pressure surface to eliminate cavitation.

20 Claims, 3 Drawing Sheets

CONTROLLED PASSIVE POROSITY SYSTEMS TO MITIGATE CAVITATION

BACKGROUND OF THE INVENTION

1. Field of the Invention

This invention relates in general to a lifting device and in particular to a controlled passive porosity system used to promote fluid communication between a low pressure surface and a high pressure surface of the lifting device.

2. Description of Related Art

Cavitation generally occurs when the local pressure of a multi-phase liquid experiencing fluid flow drops below the vapor pressure of the liquid. When the pressure of the liquid at any given point drops below the vapor pressure, the liquid at that point will transform to a gas. Since pressure drops often occur in localized areas, the transformation of the liquid to a gas generally causes gaseous bubbles in the liquid.

Lifting devices such as boat propellers, submarine propellers, impellers, and fluid pump blades are used to transfer energy to a multi-phase liquid such as water, thereby imparting a fluid flow to the liquid relative to the lifting device. Lifting devices such as hydrofoils are used to generate lift when exposed to a multi-phase liquid having a fluid flow. Lifting devices such as hydro-power plant turbine blades are used to capture energy from a flowing multi-phase liquid. All of these lifting devices are characterized by a general shape, which when exposed to a fluid flow, experiences a high pressure region on a high pressure surface and a low pressure region on a low pressure surface.

The low pressure region of the liquid along the low pressure surface of the lifting device is especially prone to occurrences of cavitation. If the pressure of the liquid at any point along the low pressure surface drops below the vapor pressure of the liquid, the liquid will transform into gaseous bubbles. The presence of cavitation along any surface of a lifting device can be very harmful to the overall performance of the lifting device. Additionally, cavitation can produce large acoustic emissions and can cause severe erosion along the surfaces of the lifting device.

The specific problems caused by cavitation are costly, both in economic terms and in performance terms. An example of this can be seen in the use of turbine generator blades in hydroelectric dams. As water is driven through the turbine blades, cavitation occurs, which causes accelerated erosion to the surfaces of the blades. Periodic maintenance is required to "replace" the material that has eroded away. This is done by welding additional material to the blade and then grinding the blade down to its original shape.

Cavitation problems are also evident in ships and submarines which use propellers for propulsion. In both ships and submarines, the efficiency of power transfer is decreased due to cavitation. In submarines, cavitation produces increased acoustical emissions, which are detrimental to the stealthy operational requirements of the vehicle.

Cavitation is usually controlled through geometry optimization of the lifting device. Another method of controlling cavitation is to restrict the operational envelope in which the lifting device will work. Less frequently used techniques of cavitation control include air injection, polymer injection, and fixed porosity systems. Passive porosity systems have been used in aircraft applications to equalize the pressures between two areas.

Cavitation problems continue to exist when using lifting devices in a multi-phase liquid. Since cavitation can occur randomly due to the distribution of nuclei or micro-air bubbles and flow turbulence, geometric optimization or restricted operational envelopes will not insure cavitation free operation.

BRIEF SUMMARY OF THE INVENTION

The controlled passive porosity system of the present invention solves the cavitation problems associated with the use of lifting devices in multi-phase liquids. The preferred embodiment of the invention includes a lifting device having an outer skin with a low pressure surface, a front surface, and a high pressure surface. A common plenum is located within the lifting device, the common plenum being located just beneath the low pressure surface, the front surface, and the high pressure surface. A plurality of holes are disposed within the low pressure surface and the high pressure surface to allow fluid communication between the space surrounding the lifting device and the common plenum. The presence of the holes in the low pressure and high pressure surfaces of the outer skin, coupled with the presence of the common plenum, makes possible fluid communication between the space adjacent to the low pressure surface and the space adjacent to the high pressure surface.

Preferably, a microelectromechanical valve and a sensor is associated with each hole in one of the surfaces (either the low or high pressure surface). The pressure sensors and valves allow individualized control over the holes, thereby enabling the passive porosity system to effectively control local occurrences of cavitation.

In normal operation, the lifting device encounters fluid flow of a multi-phase liquid such as water. As the liquid flows around the lifting device, a low pressure region generally develops adjacent to the low pressure surface and a high pressure region develops adjacent to the high pressure surface. To eliminate cavitation along the low pressure surface of the lifting device, the microelectromechanical valve located in that area is opened to allow fluid communication. The resulting fluid communication between the liquid adjacent to the high pressure surface and the liquid adjacent to the low pressure surface locally equalizes the pressures between the two surfaces. This pressure equalization raises the pressure of the liquid on the low pressure surface, thereby eliminating cavitation.

In an alternate embodiment, the lifting device has a first plenum located beneath the low pressure surface and a second plenum located beneath the high pressure surface. The upper and second plenums are fluidly connected by an intermediate fluid passage. In this embodiment, a valve can be located in the intermediate fluid passage to selectively block or allow fluid communication between the first and second plenums. Ideally, several first and second plenums would be disposed within each lifting device, with each first plenum being fluidly isolated from the other first plenums.

The operation of the alternate embodiment would be essentially the same as that of the preferred embodiment. As cavitation occurs on the low pressure surface, it would be eliminated by opening the appropriate valve. The valve would allow fluid communication between the liquid adjacent to the high pressure surface and the liquid in the area experiencing cavitation.

DETAILED DESCRIPTION OF THE PREFERRED EMBODIMENT

Figure 1:
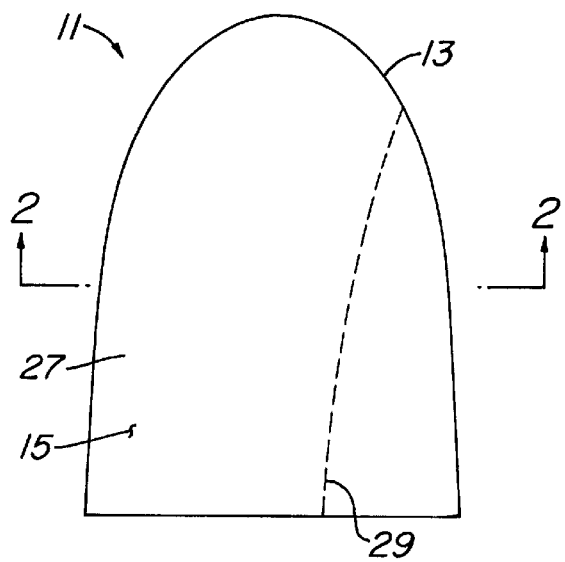
FIG. 1 is a top view of a lifting device having a controlled passive porosity system according to the present invention.
Figure 2:
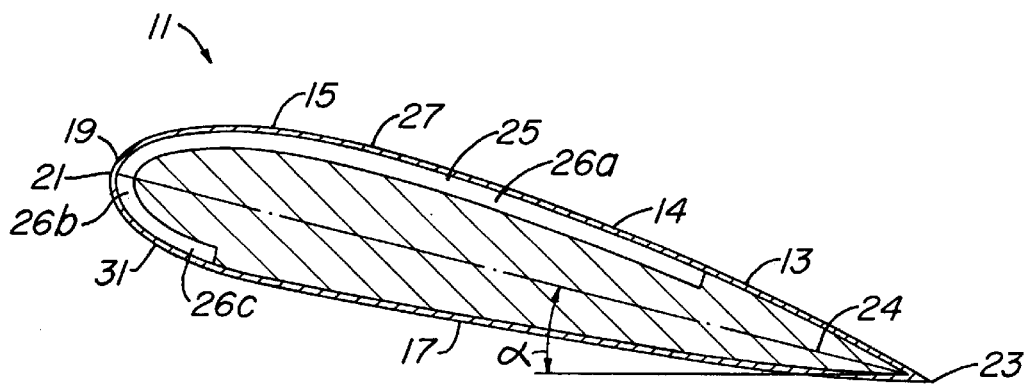
FIG. 2 is a cross-sectional side view of the lifting device of FIG. 1 taken along line 2—2.
Figure 3:
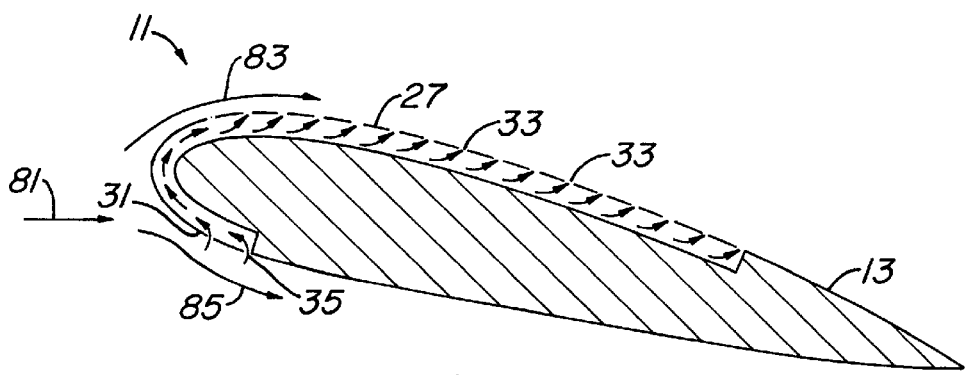
FIG. 3 is a schematic cross-sectional side view of the lifting device of FIG. 1 showing the flow paths of a liquid around and through the lifting device.

Referring to FIGS. 1, 2, and 3 in the drawings, the preferred embodiment of a controlled passive porosity system 11 to mitigate cavitation is illustrated. Porosity system 11 includes a lifting device 13 having an outer skin 14 with a low pressure surface 15, a high pressure surface 17, and a generally arcuate front surface 19. In most situations, lifting device 13 will be in the general shape of an airfoil. A leading edge 21 is defined by front surface 19 that continuously joins low pressure surface 15 and high pressure surface 17. A trailing edge 23 is defined by the convergence of low pressure surface 15 and high pressure surface 17. A chord line 24 is defined along the cross-sectional length of lifting device 13, the chord line 24 being drawn from leading edge 21 to trailing edge 23. An angle of attack α is defined as the angle made between chord line 24 and a line parallel to the direction of streamline flow experienced by lifting device 13. Angle of attack α could vary widely depending on the flow rate of the liquid relative to the lifting device. In some cases, the angle of attack a could even be zero if the flow rate was significantly high.

Generally, fluid flowing adjacent to high pressure surface 17 will have a higher pressure than fluid flowing adjacent to low pressure surface 15. The disparity in pressures is due to the positioning of lifting device 13 in the fluid with respect to the direction of fluid flow. As angel of attack a is increased, the distance over which the fluid travels is greater along low pressure surface 15 than along high pressure surface 17. This results in a higher fluid velocity and a resulting lower pressure along low pressure surface 15 (as compared to high pressure surface 17). These fluid flow characteristics are well known in the field of fluid mechanics.

At least one common plenum 25 having an upper portion 26a, a front portion 26b, and a lower portion 26c is formed beneath outer skin 14. Common plenum 25 is essentially a hollow space beneath portions of low pressure surface 15, high pressure surface 17, and front surface 19. The depth of common plenum 25 is on the order of the boundary layer thickness created by the fluid flow around lifting device 13. Several common plenums 25 could be located within lifting device 13, each common plenum being fluidly isolated from the others. A series of isolated common plenums would be one way of providing a localized mitigation of cavitation (the mitigation of cavitation provided by system 11 is explained in more detail below).

A first porosity region 27 is defined on the portion of low pressure surface 15 located adjacent to common plenum 25. In FIG. 1, a demarcation line 29 defines the extent of first porosity region 27 with the first porosity region 27 being located left of line 29 in FIG. 1. A second porosity region 31 is defined on the portion of high pressure surface 17 located adjacent to common plenum 25. First and second porosity regions 27, 31 are regions in which outer skin 14 is porous and allows fluid communication between common plenum 25 and the space surrounding lifting device 13. Typically, the distribution of porosity will range from 10% to 20% of the total surface area of the lifting device 13. However, other values of permeability may be possible.

In the preferred embodiment, first and second porosity regions 27, 31 are made porous by a plurality of holes 33, 35 disposed in outer skin 14 (shown schematically in FIG. 3). It should be noted, however, that porous regions 27, 31 could be provided by using a material having porous characteristics. Plurality of holes 33, 35 along with common plenum 25 allow fluid communication between the space adjacent to high pressure surface 17 and the space adjacent to low pressure surface 15, the fluid communication occurring through common plenum 25.

Figure 4:
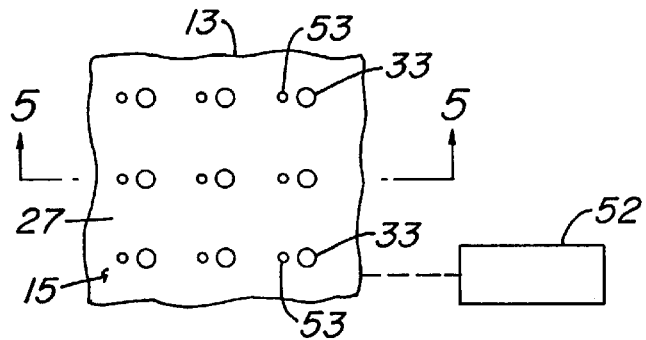
FIG. 4 is an enlarged detailed top view of an upper porous region of the lifting device of FIG. 1.
Figure 5:
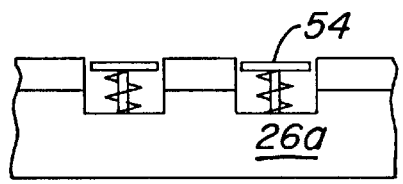
FIG. 5 is a partial sectional view of the lifting device of FIG. 1, taken along the line 5—5 of FIG. 4.

Referring to FIG. 4, a more detailed view showing a portion of the porous regions of outer skin 14 is illustrated. The view illustrated in FIG. 4 is representative of a portion of first porosity region 27. Although not shown in FIGS. 1 through 3, passive porosity system 11 may include a valving system for selectively opening and closing plurality of holes 33, 35 during normal use of the passive porosity system 11. In the preferred embodiment, the holes along either the low pressure surface 15 or the high pressure surface 17 would be capable of being opened or closed independently of the other holes. Ideally, a microelectromechanical valve 54 (FIG. 5), a controller 52, and a pressure sensor 53 would be operably associated with each hole 33, 35 to control the opening of that hole. Controller 52 would signal each microelectromechanical valve 54 to open or close based on information provided by pressure sensor 53. Only the holes 33, 35 located in one of the surfaces (low pressure surface 15 or high pressure surface 17) would be associated with valves, the holes on the opposite surface being permanently opened. Microelectromechanical valve 54 may be of various types, such as solenoid actuated.

Figure 6:
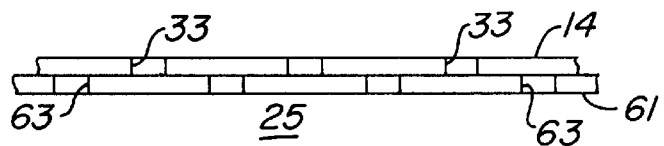
FIG. 6 is cross-sectional side view of an alternate embodiment of the lifting device of FIG. 1, showing a valving plate in a closed position, the valving plate being used with the controlled passive porosity system.
Figure 7:
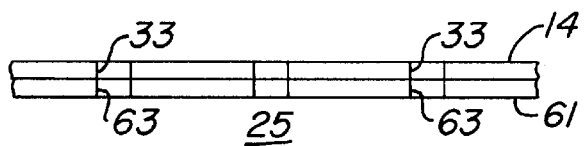
FIG. 7 is a cross-sectional side view of the valving plate of FIG. 6 in an open position.

Referring to FIGS. 6 and 7, an alternate valving system using a valving plate 61 is illustrated. Valving plate 61 is a thin plate that is used as an alternative to the microelectromechanical valves 54. The valving plate 61 is disposed in common plenum 25 against an inner surface of outer skin 14. Valving plate 61 is used to selectively block or allow fluid communication between the space adjacent to high pressure surface 17 and the space adjacent to low pressure surface 15 and through lifting device 13.

The valving plate 61 includes a plurality of holes 63 passing through the plate 61. In one use of the plate 61 (shown in FIGS. 6 and 7), the holes 63 are placed in the same spatial arrangement as the holes 33 in first porosity region 27. The valving plate 61 is located within the common plenum 25 and slidingly disposed against outer skin 14 to selectively close or open the holes 33 of first porosity region 27.

In another use of valving plate 61, the holes 63 are placed in the same spatial arrangement as the holes 35 in second porosity region 31. The valving plate is located within the common plenum 25 and slidingly disposed against outer skin 14 to selectively close or open the holes 35 of second porosity region 31.

Regardless of whether the valving plate 61 is used to block holes 33 of first porosity region 27 or holes 35 of second porosity region 31, the shape of the valving plate 61 is such that it closely matches the contour of the outer skin 14. The closely matching shape of valving plate 61 provides a sealing engagement with the outer skin 14 when valving plate is in a closed position (see FIG. 6), thereby preventing fluid communication between the space surrounding lifting device 13 and common plenum 25. When valving plate 61 slides to an open position (see FIG. 7), fluid communication between the space surrounding lifting device 13 and common plenum 25 is restored. The opening and closing of valving plate 61, like the microelectromechanical valves 54, would be controlled by a controller (not shown but similar to controller 52) based on information provided by a series of pressure sensors (not shown but similar to sensors 53). Although the use of valving plate 61 would generally provide less individual control over holes 33, 35 than the microelectromechanical valves 54 previously described, a series of valving plates could be used, each valving plate providing local fluid control over a small group of holes.

Referring more specifically to FIG. 3, the operation of controlled passive porosity system 11 is illustrated. During normal use of lifting device 13, the lifting device 13 encounters flow of a multi-phase liquid such as water, the direction of the flow being represented by line 81. As the liquid flows around lifting device 13, fluid flow adjacent to low pressure surface 15 (represented by line 83) is at a greater velocity than fluid flow adjacent to high pressure surface 17 (represented by line 85). Because of the different velocities of the fluid surrounding lifting device 13, a low pressure region develops above lifting device 13 near low pressure surface 15. A high pressure region (relative to the low pressure region) develops below lifting device 13 near high pressure surface 17. The development of these two disparate pressure regions is well-known in the field of fluid mechanics and is generally described by the Bernoulli equation.

Because the fluid encountered by lifting device 13 is a multi-phase liquid, the liquid is subject to cavitation under certain pressure conditions. Cavitation occurs when the local pressure of the liquid drops below its vapor pressure. When the liquid experiences pressures below the vapor pressure at any given point, the liquid at that point will transform to a gas. Since pressure drops often occur in localized areas, the transformation of the liquid to a gas generally causes gaseous bubbles in the liquid, which can be harmful to the overall performance of lifting device 13.

In most cases, any cavitation that occurs around lifting device 13 will occur adjacent to low pressure surface 15. As previously described, fluid adjacent to low pressure surface 15 is traveling at a higher velocity, thereby resulting in a lower pressure (relative to high pressure surface 17). To alleviate the occurrence of cavitation, passive porosity system 11 provides a means of fluid communication between the liquid adjacent to high pressure surface 17 and the liquid adjacent to low pressure surface 15.

During operation of lifting device 13 when no cavitation is present, holes 33, 35 are closed on one of the two surfaces 15, 17 to prevent fluid communication between surfaces 15, 17. As the pressure of the liquid adjacent to low pressure surface 15 drops below the vapor pressure (thus causing cavitation), selected holes 33, 35 can be opened to locally raise the pressure of the liquid where cavitation occurs. As the selected holes are opened, liquid adjacent to high pressure surface 17 enters common plenum 25, traveling to the low pressure region adjacent to low pressure surface 15 (see FIG. 3). The higher pressure liquid from high pressure surface 17 raises the local pressure of the liquid adjacent to low pressure surface 15, thus eliminating cavitation in that area.

As mentioned previously, the opening and closing of holes 33, 35 is controlled by controller 52 (FIG. 4), a plurality of pressure sensors (53, FIG. 4), and a valving system. The use of microelectromechanical valves 54 (FIG. 5) is preferred to valving plate 61 because it allows more individualized control over the holes 33, 35. This is important because of the tradeoffs created by using passive porosity system 11. While it is true that system 11 can be used to increase the performance of lifting device 13 by decreasing cavitation, system 11 can also harm the lifting performance of lifting device 13 if system 11 is overused. If all of holes 33, 35 were allowed to permanently remain open, the performance of lifting device 13 would suffer because of a tendency to equalize pressure between the high pressure region and the low pressure region.

It is conceivable that holes 33, 35 in certain areas of the lifting device could remain open permanently to alleviate ongoing cavitation problems in those areas. However, it should be noted that as the number of permanently open holes increases, the lifting performance of lifting device 13 generally decreases.

Figure 8:
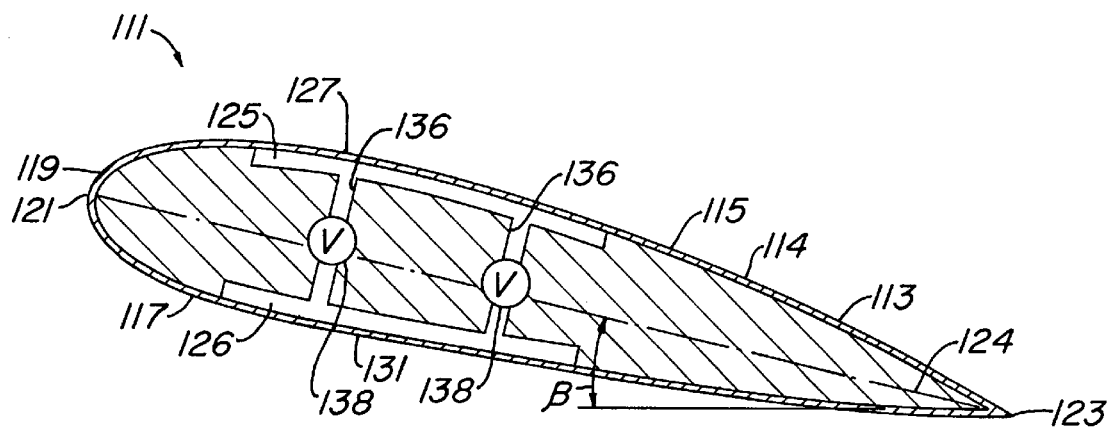
FIG. 8 is a cross-sectional side view of a lifting device having a controlled passive porosity system according to another alternate embodiment of the present invention.
Figure 9:
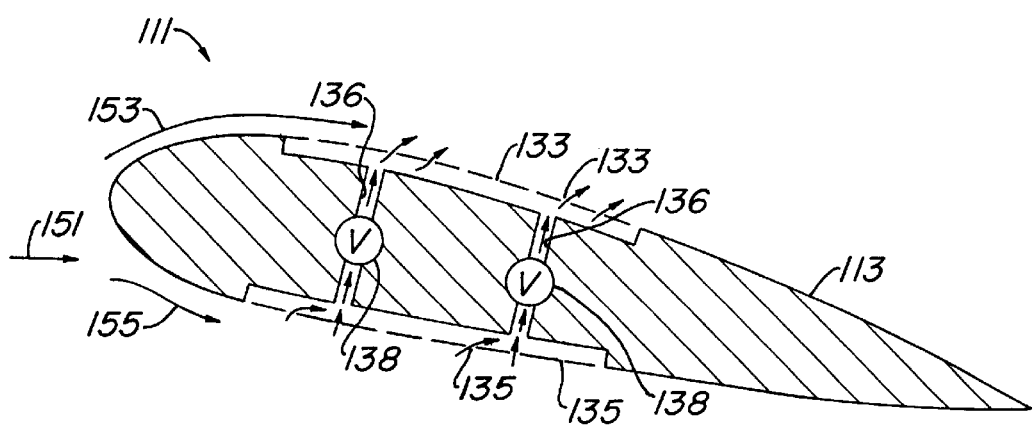
FIG. 9 is a schematic cross-sectional side view of the lifting device of FIG. 8 showing the flow paths of a liquid around and through the lifting device.

Referring to FIGS. 8 and 9, an alternate embodiment of a controlled passive porosity system 111 to mitigate cavitation is illustrated. Porosity system 111 includes a lifting device 113 having an outer skin 114 with a low pressure surface 115, a high pressure surface 117, and a generally arcuate front surface 119. In most situations, lifting device 113 will be in the general shape of an airfoil. A leading edge 121 is defined by front surface 119 that continuously joins low pressure surface 115 and high pressure surface 117. A trailing edge 123 is defined by the convergence of low pressure surface 115 and high pressure surface 117. A chord line 124 is defined along the cross-sectional length of lifting device 113, the chord line 124 being drawn from leading edge 121 to trailing edge 123. An angle of attack $\beta$, is defined as the angle made between chord line 124 and a line parallel to the direction of streamline flow experienced by lifting device 113.

A first plenum 125 and a second plenum 126 are formed beneath outer skin 114. First plenum 125 is essentially a hollow space located beneath a portion of low pressure surface 115, while second plenum 126 is a hollow space located beneath a portion of high pressure surface 117. The depth of plenums 125, 126 is on the order of the boundary layer thickness created by the fluid flow around lifting device 113.

A first porosity region 127 is defined on the portion of low pressure surface 115 located adjacent to first plenum 125. A second porosity region 131 is defined on the portion of high pressure surface 117 located adjacent to second plenum 126. First and second porosity regions 127, 131 are regions in which outer skin 114 is porous and allows fluid communication between plenums 125, 126 and the space surrounding lifting device 113. First and second porosity regions 127, 131 are made porous by a plurality of holes 133, 135 disposed in outer skin 114 (shown schematically in FIG. 9). It should be noted, however, that porous regions 127, 131 could be provided by using a material having porous characteristics.

At least one intermediate fluid passage 136 is disposed within lifting device 113, the fluid passage 136 fluidly connecting first plenum 125 to second plenum 126. Together, the second porosity region 131, the second plenum 126, the intermediate fluid passage 136, the first plenum 125, and the first porosity region 127 make possible fluid communication between the liquid adjacent to high pressure surface 117 and the liquid adjacent to low pressure surface 115. A valve 138 is disposed in each intermediate fluid passage 136 to selectively allow or block the fluid communication.

Although the use of valve 138 is preferable in passive porosity system 111, a valving system similar to that described for passive porosity system 11 could be used in place of valve 138. One arrangement would include the use of several microelectromechanical valves, similar to those of FIG. 5, each of these valves being associated with an individual hole in either low pressure surface 115 or high pressure surface 117. A different arrangement would include the use of a valving plate similar to valving plate 61, the valving plate being installed either in first plenum 125 or second plenum 126.

The operation of passive porosity system 111, which is very similar to that of passive porosity system 11, is illustrated in FIG. 9. During normal use of lifting device 113, the lifting device 113 encounters flow of a multi-phase liquid such as water, the direction of the flow being represented by line 151. As the liquid flows around lifting device 113, fluid flow adjacent to low pressure surface 115 (represented by line 153) is at a greater velocity than fluid flow adjacent to high pressure surface 117 (represented by line 155). Because of the different velocities of the fluid surrounding lifting device 113, a low pressure region develops above lifting device 113 near low pressure surface 115. A high pressure region (relative to the low pressure region) develops below lifting device 113 near high pressure surface 117.

Because of the low pressure region adjacent to low pressure surface 115, cavitation can occur, causing the liquid to transform to a gaseous state. To alleviate cavitation, valve 138 is opened, thereby allowing fluid communication between the liquid adjacent to high pressure surface 117 and the liquid adjacent to low pressure surface 115. Since the liquid adjacent high pressure surface 117 is at a higher pressure, it tends to equalize the lower pressure of the liquid adjacent to low pressure surface 115. This equalization eliminates cavitation.

Since cavitation often occurs only in localized areas, it could be desirable to have several first plenums and second plenums within the lifting device, each first plenum being isolated from the other first plenums. This feature would allow only certain areas of the low pressure surface to be in fluid communication with the high pressure surface depending on the presence of cavitation in that area of the low pressure surface.

The primary advantage of the present invention is that it provides mitigation and prevention of cavitation around a standard lifting device. Lifting devices, such as fluid pump blades, hydro-power plant turbine blades, boat propellers, submarine propellers, impellers, and hydrofoils often experience cavitation along a surface when the pressure of the liquid adjacent that surface drops below the vapor pressure. By providing a means of selective fluid communication between a high pressure side of the lifting device and a low pressure side, the pressure of the liquid where cavitation is occurring can be selectively raised to eliminate the cavitation. The prevention or delay of cavitation inception will allow higher operating conditions for a given lifting device or will decrease acoustic emissions and surface erosion at nominal operational conditions.

Another advantage of the present invention is that it allows selected and controlled porosity so that cavitation can be controlled in small, localized areas. Another advantage of the present invention is that the selective equalization of pressure between the surfaces of the lifting device does not greatly and adversely affect the lifting performance of the lifting device.

It should be apparent from the foregoing that an invention having significant advantages has been provided. While the invention is shown in only one of its forms, it is not just limited but is susceptible to various changes and modifications without departing from the spirit thereof.

I claim:

1. A lifting device for imparting relative fluid flow in a multi-phase liquid comprising:
    a leading edge, a trailing edge, a low pressure surface having a first porosity region, and a high pressure surface having a second porosity region, each of the porosity regions comprising a plurality of holes in one of the surfaces;
    a first plenum located within the lifting device and in communication with the plurality of holes in the first porosity region;
    a second plenum located within the lifting device and in communication with the plurality of holes in the second porosity region, the second plenum being fluidly connected to the first plenum; and
    at least one communication passage fluidly connecting the first plenum to the second plenum for allowing fluid flow from the second plenum to the first plenum.

2. A lifting device for imparting relative fluid flow in a multi-phase liquid comprising:
    a leading edge, a trailing edge, a low pressure surface having a first porosity region, and a high pressure surface having a second porosity region, each of the porosity regions comprising a plurality of holes in one of the surfaces;
    a first plenum located within the lifting device and in communication with the holes in the first porosity region;
    a second plenum located within the lifting device and in communication with the holes in the second porosity region, the second plenum being fluidly connected to the first plenum; and
    at least one valve for selectively blocking and allowing fluid flow from the plenums through at least one of the holes to communicate pressure of fluid flowing over one of the porosity regions to the other of the porosity regions.

3. A lifting device for imparting relative fluid flow in a multi-phase liquid comprising:
    a leading edge, a trailing edge, a low pressure surface having a first porosity region, and a high pressure surface having a second porosity region, each of the porosity regions comprising a plurality of holes in one of the surfaces;
    a first plenum located within the lifting device and in communication with the holes in the first porosity region;
    a second plenum located within the lifting device and in communication with the holes in the second porosity region, the second plenum being fluidly connected to the first plenum;

at least one valve for selectively blocking and allowing fluid flow through at least one of the holes for changing pressure of fluid flowing over the first porosity region; and at least one sensor operably connected to the valve for supplying the valve with information regarding the existence of cavitation.

4. A lifting device for imparting relative fluid flow in a multi-phase liquid comprising:

a leading edge, a trailing edge, a low pressure surface having a first porosity region, and a high pressure surface having a second porosity region, each of the porosity regions comprising a plurality of holes in one of the surfaces;

a first plenum located within the lifting device and in communication with the holes in the first porosity region;

a second plenum located within the lifting device and in communication with the holes in the second porosity region, the second plenum being fluidly connected to the first plenum;

at least one valve for selectively allowing and blocking fluid communication through the plenums between the holes of the first porosity region with the holes of the second porosity region, the valve allowing communication while in an open position and preventing communication while in a closed position;

at least one sensor for determining the existence of cavitation adjacent to the low pressure surface; and a controller operably connected to the valve and the sensor, the controller causing the valve to open when the sensor signals that cavitation is occurring, the controller causing the valve to close when the sensor signals that cavitation is not present.

5. The lifting device according to claim 4 wherein the valve comprises an electromechanical valve located in one of the holes.

6. A lifting device for imparting relative fluid flow in a multi-phase liquid comprising:

a leading edge, a trailing edge, a low pressure surface having a first porosity region, and a high pressure surface having a second porosity region, each of the porosity regions comprising a plurality of holes in one of the surfaces;

a first plenum located within the lifting device and in communication with the holes in the first porosity region;

a second plenum located within the lifting device and in communication with the holes in the second porosity region, the second plenum being fluidly connected to the first plenum;

at least one valving plate having a plurality of holes for selectively blocking fluid communication through the lifting device between the holes of the first and second porosity regions, the holes of the valving plate adapted to align with selected ones of the holes in one of the porosity regions of the lifting device while in an open position, the valving plate being disposed within one of the plenums and having a closely matching contour of one of the surfaces of the lifting device, the valving plate being capable of movement within said one of the plenums between the open position and a closed position; and the closed position being attained when the holes of the valving plate are misaligned with the selected holes of said one of the porosity regions, thereby preventing fluid communication of the liquid between the low pressure surface and the high pressure surface.

7. A lifting device for imparting relative fluid flow in a multi-phase liquid comprising:

a leading edge, a trailing edge, a low pressure surface having a first porosity region, and a high pressure surface having a second porosity region, each of the porosity regions comprising a plurality of holes in one of the surfaces;

a first plenum located within the lifting device and in communication with the holes in the first porosity region;

a second plenum located within the lifting device and in communication with the holes in the second porosity region, the second plenum being fluidly connected to the first plenum; and wherein the first and the second plenums are joined to each other by a third plenum that extends around and beyond the leading edge.

8. A lifting device for imparting relative fluid flow in a multi-phase liquid comprising:

a leading edge, a trailing edge, a low pressure surface having a first porosity region, and a high pressure surface having a second porosity region, each of the porosity regions comprising a plurality of holes in one of the surfaces;

a first plenum located within the lifting device and in communication with the holes in the first porosity region;

a second plenum located within the lifting device and in communication with the holes in the second porosity region, the second plenum being fluidly connected to the first plenum;

at least one passage extending through the lifting device between the first and second plenums;

a valve located in the passage for selectively allowing and blocking flow through the passage;

at least one sensor for determining the existence of cavitation around the lifting device; and a controller operably connected to the valve and the sensor, the controller opening the valve to eliminate cavitation or closing the valve when cavitation is not present.

9. A lifting device for imparting relative fluid flow in a multi-phase liquid comprising:

a leading edge, a trailing edge, a low pressure surface having a first porosity region, and a high pressure surface having a second porosity region, each of the porosity regions comprising a plurality of holes in one of the surfaces;

a first plenum located within the lifting device and in communication with the holes in the first porosity region;

a second plenum located within the lifting device and in communication with the holes in the second porosity region, the second plenum being fluidly connected to the first plenum; and a valve mounted to each hole in one of the porosity regions for selectively blocking and allowing fluid flow through each of the holes in said one of the porosity regions.

10. The lifting device according to claim 1 wherein the first and second porosity regions occupy 10% to 20% of the total surface area of the lifting device.

11. The lifting device according to claim 1 wherein at least one communication passage comprises a plurality of communication passages extending between the first and second plenums.

12. A lifting device for imparting relative fluid flow in a multi-phase liquid comprising:
   a low pressure surface having a first porosity region, the first porosity region having a plurality of holes;
   a high pressure surface having a second porosity region, the second porosity region having a plurality of holes;
   a trailing edge defined by the convergence of the low pressure surface and the high pressure surface;
   a leading edge defined by a generally arcuate front surface that continuously joins the low pressure surface and the high pressure surface;
   a first plenum located within the lifting device and in communication with the holes in the first porosity region;
   a second plenum located within the lifting device and in communication with the holes in the second porosity region, the second plenum being fluidly connected to the first plenum; and
   at least one valve for selectively blocking and allowing fluid communication through the lifting device between the first and second porosity regions, the valve communicating pressure of liquid flowing over the high pressure surface with pressure of liquid flowing over the low pressure surface fluid while in an open position and preventing communication while in a closed position.

13. The lifting device according to claim 12 further comprising:
   at least one sensor for determining the existence of cavitation in the liquid adjacent to the lifting device; and
   at least one controller operably associated with the valve and the sensor, the controller opening the valve when the sensor signals that cavitation is occurring, the controller closing the valve when the sensor signals that cavitation is not occurring.

14. The lifting device according to claim 12 wherein:
   the valve further comprises at least one valving plate having a plurality of holes for aligning with selected holes in one of the porosity regions while in the open position.

15. The lifting device according to claim 14 wherein said at least one valve comprises a plurality of valves, each of the valves being located at one of the holes in one of the porosity regions.

16. The lifting device according to claim 12 further comprising:
   a plurality of passages extending between the first and second plenums;
   wherein said at least one valve comprises a plurality of valves, each located in one of the passages.

17. The lifting device according to claim 12 wherein the first and second plenums are joined to each other by a third plenum that extends around and is recessed within the leading edge.

18. A method for mitigating cavitation occurrences around a lifting device having a low pressure surface and a high pressure surface, the lifting device being used to impart fluid flow in a multi-phase liquid, the method comprising:
   providing a first porosity region having a plurality of holes in the low pressure surface;
   providing a second porosity region having a plurality of holes in the high pressure surface;
   providing a first plenum fluidly connected to the holes in the first porosity region;
   providing a second plenum fluidly connected to the holes in the second porosity region;
   fluidly connecting the first plenum to the second plenum; and
   selectively communicating pressure of liquid flowing over the high pressure surface through the second porosity region, into the second plenum, into the first plenum, through the first porosity region, and to the low pressure surface.

19. A method for mitigating cavitation occurrences around a lifting device having a low pressure surface and a high pressure surface, the lifting device being used to impart fluid flow in a multi-phase liquid, the method comprising:
   providing a first porosity region having a plurality of holes in the low pressure surface;
   providing a second porosity region having a plurality of holes in the high pressure surface;
   providing a first plenum fluidly connected to the holes in the first porosity region;
   providing a second plenum fluidly connected to the holes in the second porosity region;
   fluidly connecting the first plenum to the second plenum;
   selectively communicating pressure of liquid flowing over the high pressure surface through the second porosity region, into the second plenum, into the first plenum, through the first porosity region, and to the low pressure surface;
   sensing the pressure of the liquid adjacent the surfaces to determine the existence of cavitation; and
   controlling the communication of pressure between the surfaces.

20. The method according to claim 19 wherein the step of controlling further comprises:
   allowing communication when the sensing indicates that cavitation is occurring; and
   preventing communication when the sensing indicates that cavitation is not present.

* * * * *